United States Patent
Wilt et al.

[19]

[11] Patent Number: 6,058,434
[45] Date of Patent: May 2, 2000

[54] APPARENT NETWORK INTERFACE FOR AND BETWEEN EMBEDDED AND HOST PROCESSORS

[75] Inventors: Michael J. Wilt, Windham; Todd Andrew Ballantyne, Amherst, both of N.H.

[73] Assignee: Acuity Imaging, LLC, Nashua, N.H.

[21] Appl. No.: 09/026,052

[22] Filed: Feb. 19, 1998

Related U.S. Application Data

[60] Provisional application No. 60/066,583, Nov. 26, 1997.

[51] Int. Cl.[7] ........................................ G06F 13/00
[52] U.S. Cl. .................. 709/300; 709/217; 709/250; 709/302
[58] Field of Search ................... 709/203, 217, 709/218, 219, 230, 250, 300, 301, 302; 710/101, 106, 126, 129

[56] References Cited

U.S. PATENT DOCUMENTS

| | | | |
|---|---|---|---|
| 5,588,140 | 12/1996 | Misukanis et al. | 395/500.4 |
| 5,603,051 | 2/1997 | Ezzet | 710/2 |
| 5,659,684 | 8/1997 | Giovannoni et al. | 709/250 |
| 5,734,865 | 3/1998 | Yu | 709/250 |
| 5,790,977 | 8/1998 | Ezekiel | 702/122 |
| 5,896,499 | 4/1999 | McKelvey | 713/201 |

*Primary Examiner*—Viet D. Vu
*Attorney, Agent, or Firm*—Bourque & Associates, P.A.

[57] ABSTRACT

An apparent network interface permits one processor such as a processor embedded within a larger processing system (an embedded processor) to communicate to a host processor or other processors and devices on the network to which the embedded processor is attached, using standard network communication mechanisms/protocols such as TCP/IP, NFS, FTP, HTTP, etc. The web server protocol HTTP is particularly useful because it permits the embedded computer to publish a user interface for remote monitoring and remote control using a standard web browser application. The invention provides the host computer with an apparent network interface that appears to be a standard network device, such as an Ethernet interface card. This apparent interface communicates directly with the embedded processor, which appears to be a device on this apparent network. Significant cost savings and performance enhancements are realized by implementing the communication directly over the host computer's peripheral bus rather than using standard network hardware such as Ethernet hardware.

15 Claims, 5 Drawing Sheets

APPARENT NETWORK INTERFACE FOR AND BETWEEN EMBEDDED AND HOST PROCESSORS

This appln claims the benefit of U.S. Provisional No. 60/066,583, filed Nov. 26, 1997.

FIELD OF THE INVENTION

This invention relates generally to processing systems and particularly, to a system and method for providing an apparent network interface between a host processor and an embedded processor.

BACKGROUND OF THE INVENTION

Most of the currently available stand alone processing systems, such as stand alone vision systems, communicate with other computers or other types of processing systems such as factory automation equipment using serial communication (RS-232 or similar), digital I/O, Ethernet or other network protocols. An embedded processor sits inside a host processor and has its own processing capabilities thereby offloading processing tasks from the host processor. Embedded processors such as embedded machine vision processors typically communicate with a host processor through mechanisms such as peripheral bus mailboxes.

While these mechanisms are all appropriate and useful for communicating with other pieces of equipment in the immediate vicinity of the machine vision computer, they do little to support remote monitoring and remote control of the processing systems such as a vision computer. Another limitation of these systems is that the communication mechanism with an embedded vision processor is different from what is used in a stand alone system.

Recent innovations in networking hardware and software have made networking technology much more useful and popular. In particular, web browsers have become a universally accepted user interface found on virtually all home and office computers. Accordingly, a need and an opportunity exists for a system and method to interface an embedded processing system, such as an embedded processor, with another device, such as a host computer, using a network type protocol (network interface) without the need for traditional network type hardware.

SUMMARY OF THE INVENTION

This invention features a network interface that permits one processing system, such as an embedded machine vision computer, to communicate to other devices using standard network mechanisms such as TCP/IP, NFS, FTP, HTTP, etc. The web server protocol HTTP is particularly useful because it permits the embedded computer to publish a user interface for remote monitoring and remote control using a standard web browser application.

This invention provides the host computer with an apparent interface that appears to be a standard network device, such as an Ethernet interface card. This apparent interface communicates directly with the embedded machine vision computer, which appears to be a device on this apparent network. Significant cost savings and performance benefit are realized by implementing the communication directly over the host computer's peripheral bus rather than using standard network hardware such as Ethernet.

The apparent interface enables communications between a host computer and a processor or CPU embedded within the host computer. The present invention takes place and is preferably implemented in the lowest transport layer of the network stack in the operating system of both the host and the embedded processor. The embedded processor is connected to the host computer or processor via a host computer peripheral interface bus.

The present apparent network interface includes device driver software, which runs on the host computer, and which provides the apparent network interface to the embedded computer. The device driver software communicates directly with the embedded computer. In addition to the device driver software for the host computer, the interface further includes device driver software that runs on the embedded computer and which provides an apparent network interface to the host computer and communicates directly with the host computer.

DESCRIPTION OF THE PREFERRED EMBODIMENT

Figure 1:
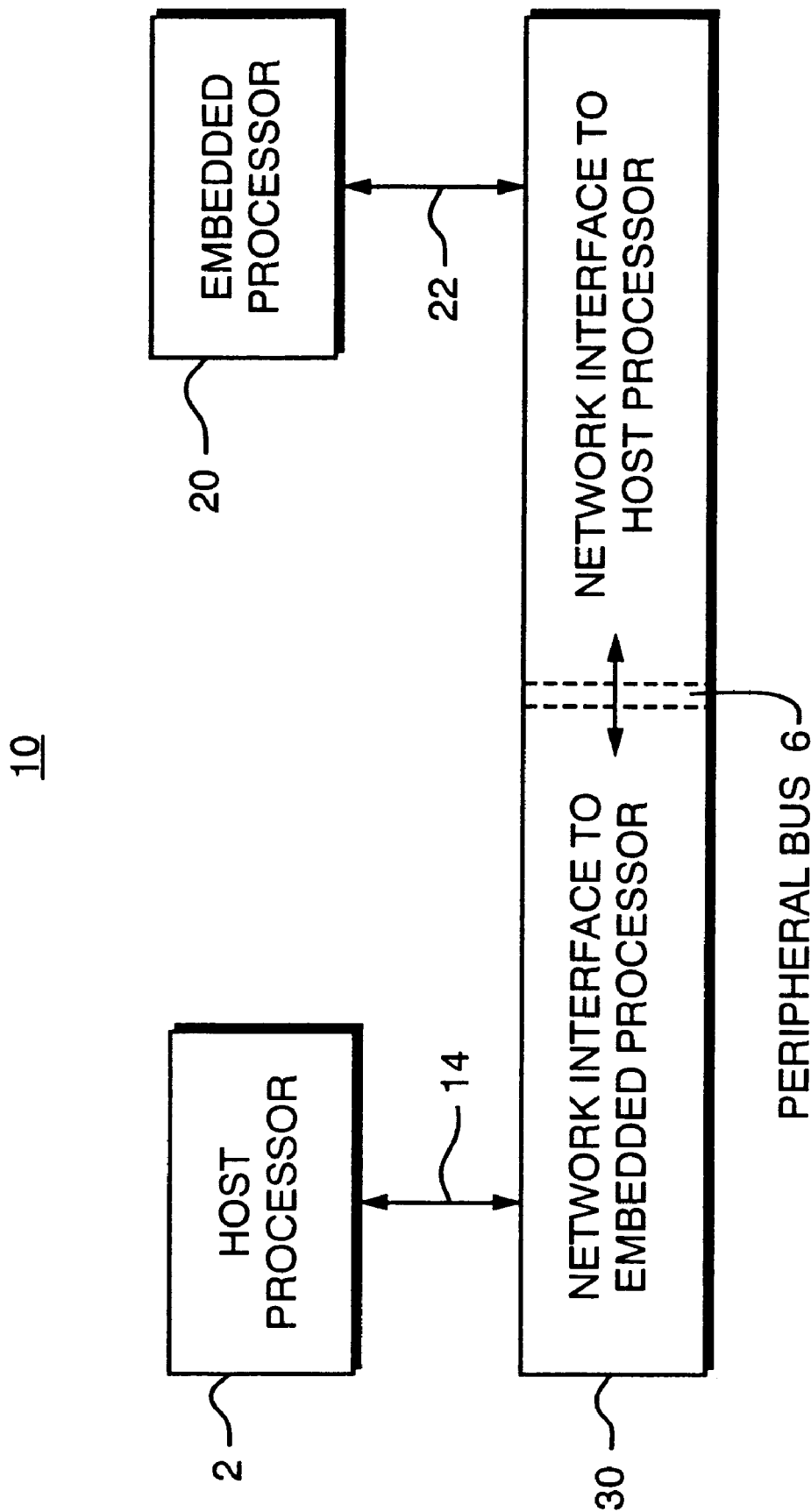
FIG. 1 is a block diagram illustrating the apparent network interface between a host and an embedded processor according to the present invention.

A processing system 10, FIG. 1, incorporating the apparent network interface 30 of the present invention includes a host processor/processing system 2 and an embedded processor/processing system 20. The host processor 2 communicates with the embedded processor utilizing the host peripheral bus 6 which, in the preferred embodiment, is a PCI bus, although this is not a limitation of the present invention. The host processor 2 communicates with the apparent network interface 30 utilizing a standard host protocol 14 such as the network software incorporated into Microsoft Windows 95 or NT operating systems. Similarly, the embedded processor 20 also communicates with the apparent network interface 30 utilizing its own embedded system protocol software 22 such as Microsoft Windows 95 and NT or any other operating systems. The apparent network interface 30, according to the present inventions, is preferably implemented as software (in the form of the lowest level interface protocol layer of the operating system such as Wind River's VxWorks) and/or a software/hardware combination.

Figure 2:
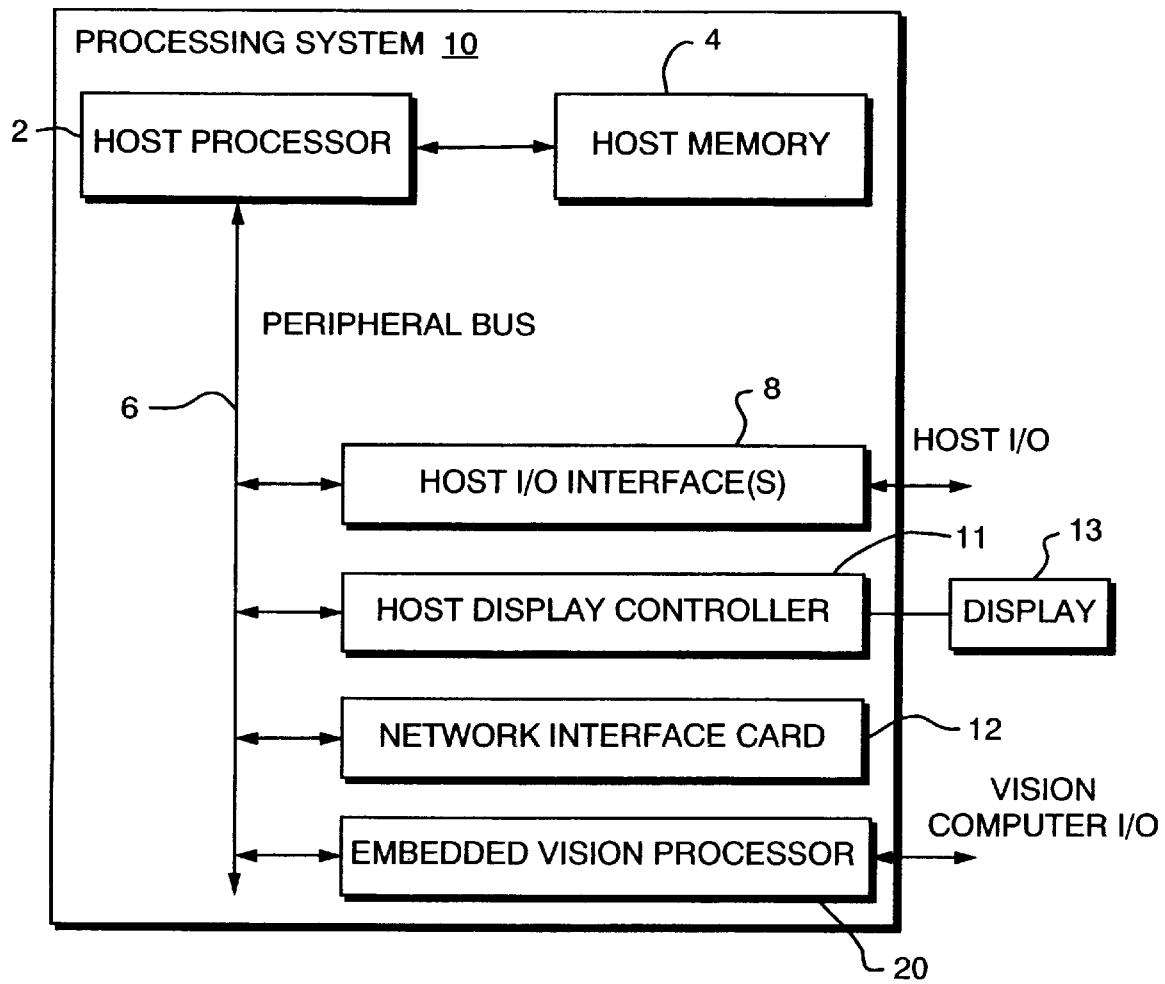
FIG. 2 is a schematic diagram showing a typical vision system configuration containing a host computer and an embedded computer which would utilize the apparent network interface of the present invention.

As shown in greater detail, a processing system 10, FIG. 2, implementing the present invention includes a host CPU or processor 2, host memory 4 and a host peripheral bus 6 such as a PCI bus. The host peripheral bus 6 communicates with a number of devices that are generally known as peripheral devices to the host CPU.

Typical peripheral devices connected to a typical peripheral bus 6 include at least one host input/output (I/O) interface 8 which, in the preferred embodiment, is a multifunction I/O controller card which interfaces with any one of a number of well known I/O devices, such as one or more keyboard, mouse and the like. Another common peripheral device is a host display controller 11, which is preferably a VGA adapter card, which may include hardware or software enhancements, such as accelerated display drivers.

Host display controller 11 routes a display signal from the host CPU 2 to a display device 13, such as a computer monitor. Additionally, a network interface card 12 is connected to the peripheral bus 6, to interface the host CPU 2 to an external computer network.

Finally, the host computer includes an embedded vision computer 20, which interfaces with the host CPU 2 via peripheral bus 6. The embedded vision system computer 20 itself interfaces with vision system I/O devices, such as cameras and the like.

This invention provides the embedded computer 20 with an apparent network interface to the host processor 2 using the network interface configuration and protocol of the present invention. In the present embodiment, the network interface is described as a software protocol although this is not a limitation of the present invention. To the host computer 2, this network interface appears to be an interface card which provides a connection to a single external computer, such as an embedded vision computer 20. The embedded vision computer 20 has a similar interface which provides its connection to the host computer 2, thus implementing the network interface of the present invention.

Routing software running on the system 10 may be used to permit the embedded computer 20 to communicate with other devices attached to the external network via network adapter card 12.

The preferred embodiment of the present invention, without limitation, however, is implemented with a machine vision computer 20 as an embedded processing system which has the following features and attributes:

The embedded computer 20 is preferably on a separate circuit board and interfaces to a host computer 2 via the host computer's peripheral interface bus 6.

Figure 3:
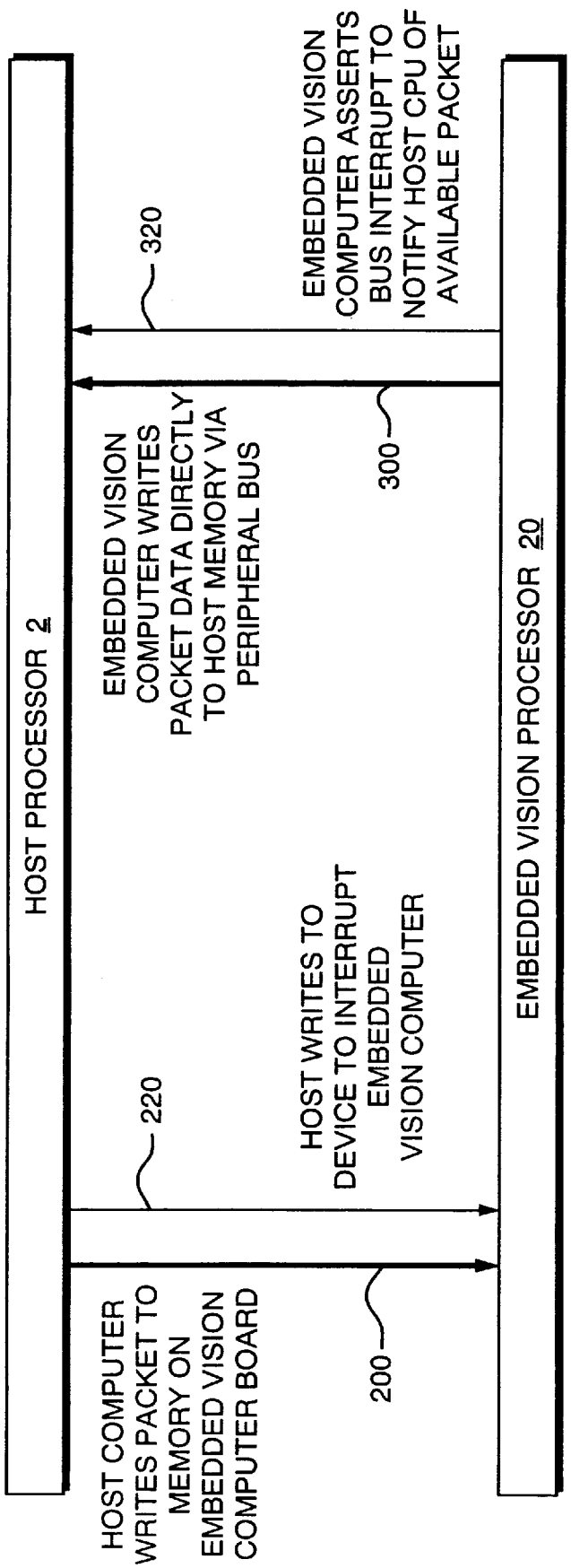
FIG. 3 is a schematic diagram showing the communication mechanism employed to implement the apparent network interface of the present invention.
Figure 4:
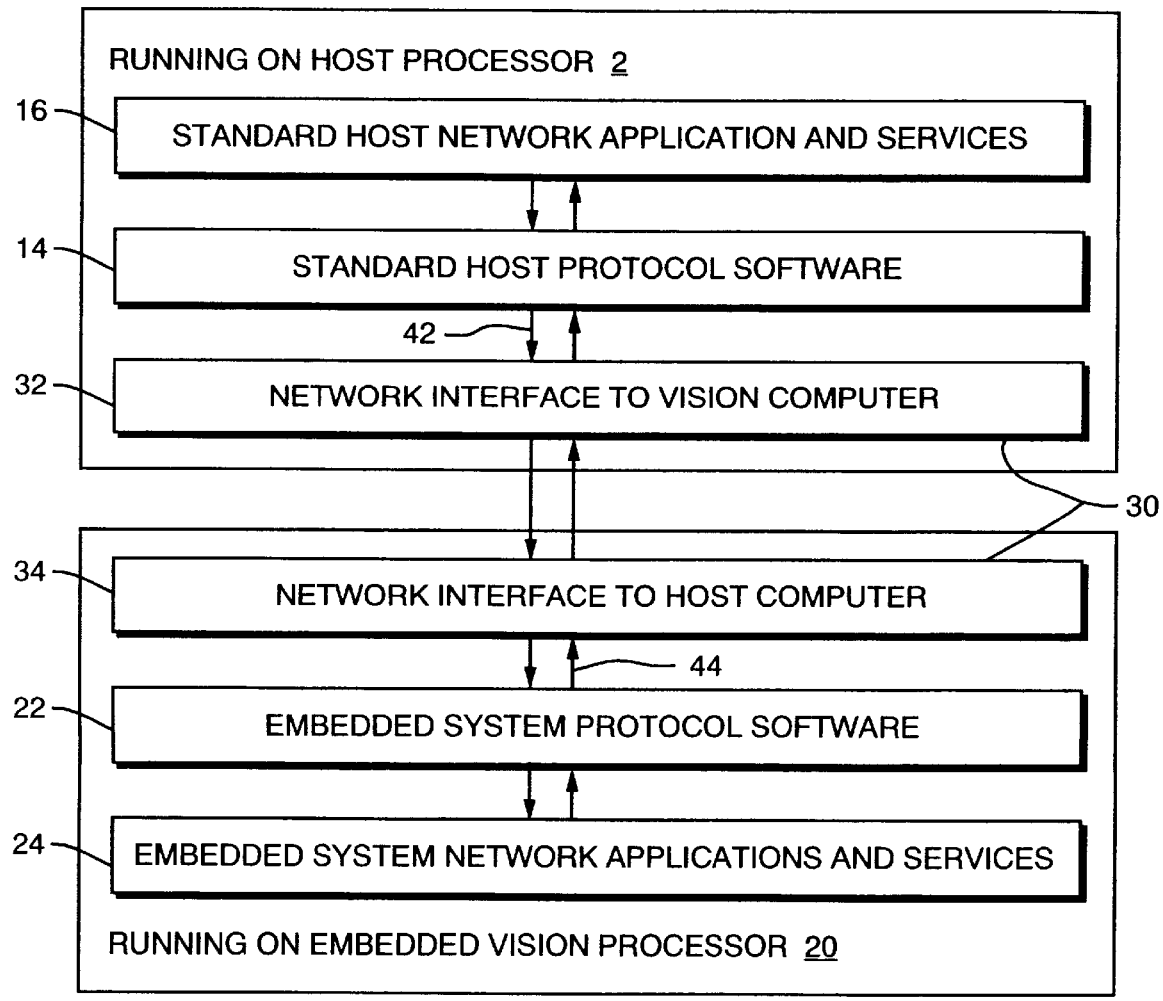
FIG. 4 is a schematic diagram showing the software architecture of the network interface of the present invention.

The embedded computer 20 is capable of running its own operating system 22, FIG. 3, including network services 24.

The embedded computer 20 board contains some memory which is visible to the host CPU 2 via the host CPU's peripheral interface bus 6.

The embedded computer 20 is capable of interrupting the host computer 2 via the host computer's peripheral interface bus 6.

The host computer 2 is capable of interrupting the embedded computer 20 by writing to a device on the embedded computer board via the host computer peripheral interface bus 6.

These attributes of this invention described for exemplary purposes as an embedded vision computer 20 facilitate the implementation of the apparent network interface 30 of the present invention. The first component of the software for one such implementation of the present invention includes an NDIS mini-port driver 32 running under the host computer operating system 14, such as Windows NT or Windows 95, which simultaneously runs other standard host software, such as network applications and services 16.

The second component of the software for one embodiment of the present invention includes a network device driver 34 running under VxWorks operating system on the embedded vision computer 20. This invention also applies to other combinations of host and embedded processor operating systems.

Both of these network communication/interface drivers, 32 and 34 implement standard interfaces, 42 and 44 with their respective operating systems 14 and 22. Internally, however, these drivers communicate directly with each other via the host computer's peripheral interface bus 6 rather than driving traditional network hardware such as an Ethernet board, which would be the usual function of these types of drivers.

When the host CPU 2 has a packet of data to be sent out on its network interface 32 to the embedded vision computer 20, it calls the device driver and passes it the data to be sent. Normally, the device driver for a network interface card would copy the packet data to the network interface device and instruct the device to send the packet out on the network. However, the drivers used to implement the present invention differ from normal device drivers in that they first copy a packet of data to a shared memory location visible to the other computer and then interrupt the other computer.

This is shown schematically in FIG. 3 as steps 200, 220, 300 and 320, which represent: the host computer 2 writing a packet of data to memory on or associated with the embedded vision computer 20; the host computer 2 interrupting the embedded vision computer 20 to advise the embedded vision computer 20 that a packet of data has been delivered; the embedded vision computer 20 writing a packet of data directly to memory associated with the host processor 2 via the host computer peripheral bus; and the embedded vision computer 20 asserting a bus interrupt to notify the host CPU 2 that a packet of data is available, respectively.

A substantial performance benefit is achieved by implementing all data transfers using burst-mode write cycles over the peripheral bus 6. Both the host 2 and the embedded computer 20 can transfer data directly to the other computer's memory by performing bus-master write cycles. This way, each computer is able to read packet data efficiently from its own memory, rather than using less efficient read cycles over the peripheral bus 6 to read the data from the other computer's memory.

There are two network drivers used to implement the apparent Ethernet-over-PCI capability (network interface) of the present invention. The first driver is to support the real-time operating system 22 on the embedded machine vision computer 20, and the second is to support the GUI operating system 14 on the host computer 2. These two drivers are the endpoints for the two-node apparent network 30 over the bus 6. While the drivers are different due to the operating systems under which they run, the data structures used are necessarily identical to allow the communication to function properly.

Figure 5:
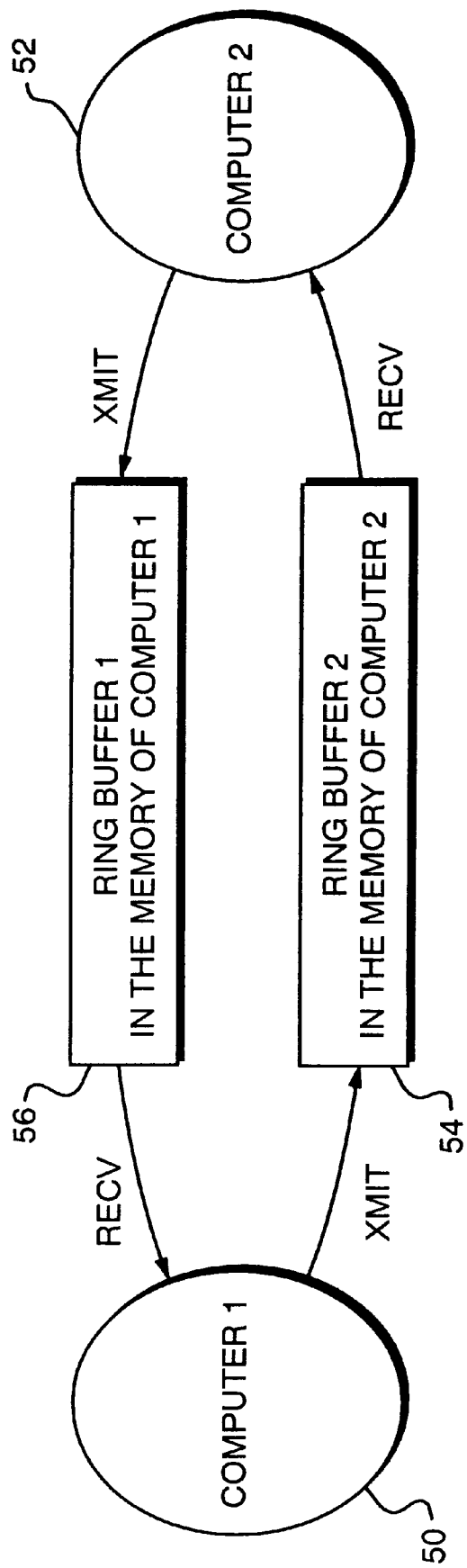
FIG. 5 is a schematic diagram which illustrates data communication between two devices using the network interface system and method of the present invention.

There are two network buffers (ring buffers one (56) and two (54) of FIG. 5) used to implement the present apparent network 30. Each of the two buffers are both transmit and receive buffers. However, the two computers/processors (host 2 and embedded 20) have differing views on which is the transmit and which is the receive buffer.

Communication is effected according to the following protocol (keeping in mind that computer 1 and 2 can be either the host or embedded processor): Computer 1, 50, writes data to its own transmit buffer 54, which is ring buffer 2, 54, in the disclosed ring buffer implementation. This same ring buffer 54 is viewed by Computer 2, 52 as its own receive buffer. Therefore, as soon as Computer 1 is done writing the data in its transmit buffer 54, the data has been received by Computer 2 since the Computer 1 transmit buffer and the Computer 2 receive buffer are physically the same ring buffer 54.

Likewise, when Computer 2 52 writes data to its transmit buffer, which is ring buffer 1, 56, of FIG. 5, the data has been received by Computer 1, 50, since the Computer 1 receive buffer is physically the same buffer as the transmit buffer of Computer 2, namely ring buffer 56.

The key to good performance when implementing the present invention over a PCI bus in particular, is to physically place the transmit Buffers on the receiving computer. In this way, the transmit operations will use PCI writes which are very efficient while the receive operations will use local memory reads which are also very efficient. This avoids using PCI reads which are not efficient. This network "ring buffer" implementation is depicted in FIG. 5. Buffer wrapping should be guaranteed by design and the following exemplary depiction of a ring buffer is not to be considered a limitation of the present invention.

The ring buffer data structure has four fields. The first is a 32-bit command field which can be used to enhance the interrupt processing by allowing data to be passed outside of the Ethernet packets. The interrupt handlers can read this field to look for special requests outside of the usual receive packet indications. Some examples of this are a heartbeat indication in the absence of network traffic, a packet acknowledgment back to the transmitting computer, or control information to indicate a computer or network reset.

The next two 32-bit words are the write and read pointers for the ring buffer. The write pointer indicates the next 32-bit location in the ring which can be written. The read pointer indicates the last 32-bit word read.

The final part of the data structure is the ring buffer. The ring size is the total number of 32-bit words allocated to the buffer–minus the three words used for the command, read, and write words. As packets are put in the ring they are encapsulated in framing overhead. A packet will always start with the first framing pattern word, a 32-bit word with the value of 0xAAAAAAAA. The next 32-bit word after the framing pattern will contain the length in bytes of the total frame, (Ethernet packet size+pad bytes+framing overhead) and the length in bytes of the Ethernet packet. The frame length is the upper 16 bits and the Ethernet packet length is the lower 16 bits. After the length field comes the actual Ethernet packet. The packet is padded if need be so that it completely fills the final 32-bit word. The final word in the frame comes after the Ethernet packet. It is the final framing pattern value of 0x55555555.

The framing patterns are used to detect ring buffer errors, and allow error recovery in the event the ring becomes corrupted. An example of a packet entry in a ring buffer is depicted in the Table 1 below.

TABLE 1

| 0 | Command | | Write Pointer | Read Pointer | Frame Pattern1 |
|---|---|---|---|---|---|
| 16 | Flength (36) | Elength (17) | Data[0–3] | Data[4–7] | Data[8–11] |
| 32 | Data[12–15] | | Data[16] Pad[17–19] | Frame Pattern2 | Frame Pattern1 |
| 48 | Flength | Elength | Data[0–3] | Data[4–7] | — |
| 64 | — | | — | Frame Pattern2 | — |
| — | — | | — | — | — |
| — | — | | Frame Pattern2 | Frame Pattern3 | Frame Pattern3 |
| | Frame Pattern3 | | Frame Pattern3 | Frame Pattern3 | Frame Pattern3 |

You will notice references to Frame Pattern 3 in the above ring illustration. This pattern has a value of 0xA5A5A5A5 and indicates the rest of the ring buffer is empty. A packet is never allowed to wrap from the end of the ring to the beginning. This is a necessary restriction since the operating systems on both computers expect packets to be in contiguous memory when they are sent to or received from the network interface. This precludes wrapping a packet from the end of the buffer to the beginning. Each driver checks the length of the packet about to be sent. If it won't completely fit at the end of the ring, the fill pattern is written and the write index set to the beginning of the ring buffer before writing the packet.

The data structures described above are the backbone of the network driver. However, there are two other important considerations when using data structures in shared memory between two independent computers. The first is the issue of concurrent access to the same memory. It is possible for two independent computers to read the same memory location, modify the value, and write it back. However, the value written last is the only one retained. Therefore, the first computer to complete the write will have its value replaced by the second computer. The first computer will then have an incorrect understanding of what is in memory.

With a bus-level locking mechanism this could be avoided; however, not all PCI devices support locking and if they did it would cause performance problems on the bus so a different mechanism was used. The responsibility for updating the read and write pointers was distributed between the two computers. A computer can only write its transmit buffer write pointer and its receive buffer read pointer. In addition, these values can never contain intermediate results. They must be updated to always hold a valid pointer. In this way, the partner computer can always read its receive buffer write pointer and transmit buffer read pointer and be sure of their validity. This removes the need for a bus level locking mechanism.

The second concurrency problem is with the computers' ability to interrupt each other. The registers which cause and mask interrupts will be shared by both computers at times. This leads to a second concurrency problem. To solve this problem each interrupt mask and generation location must be independently addressable. This is accomplished by having the hardware "exclusive-or" the new data with the old. This makes every bit independently addressable and again avoids needing bus-level locking.

Ring buffer management can also include fixed length (e.g. 1536 byte, 2 kB) buffers whose ownership is determined by a status bit. The shared status bit can be set and reset according to rules similar to those set forth above. A transmit buffer may be set up as a receive buffer only by the transmit process which may de-assert the status bit. A receive process may only assert the status bit, which hands ownership back to the transmit process. Both processes need only check this bit to know whether they can write to (transmit process) or read from (receive process) any particular buffer. All buffers are initially owned by the transmit process.

Despite the foregoing preferred embodiment, it is evident that there are other implementations that will achieve the same functionality. Each state machine could own a pointer, similar to the foregoing read/write pointers, that points to the start of a buffer and is incremented as described later. As with the foregoing preferred embodiment, there will be a set of buffers for communication from the embedded CPU to the host PC and another set for communication in the reverse direction. As before, there will be locking issues that have to be resolved.

A simple fixed length buffer is shown in Table 2:

TABLE 2

| | |
|---|---|
| 0 | Status & Command |
| 4 | Length |
| 8 | Data [0–3] |
| 12 | Data [4–7] |
| 16 | Data [8–11] |
| 20 | Data [12–15] |

The Status and Command word will contain a bit (most likely the most significant bit to make its assertion easily detectable with signed arithmetic) that indicates whether the buffer owner is the transmit process or the receive process. Arbitrarily assign ownership to the transmit process when the ownership bit is a logic low, or '0', and to the receive process when it is logic high, or '1'. To ensure correct locking between processes, only the transmit process is allowed to assert the bit to logic '1' and only the receive process is allowed to de-assert the bit of logic '0'.

All buffers are initially owned by the transmit process. The receive process will check the buffer ownership bit which it currently points to (i.e. the first buffer initially) either with a timer controlled regularity or when the transmit process asserts an interrupt to the receive process. When the receive process finds a buffer it doesn't own (which may be the first buffer initially), it will not move to check the following buffers as by definition, they will not be owned by the receive process.

The transmit process will load each packet from the networking stack into a buffer in turn and will assert the ownership bit of the buffer to the receive process after the load is complete. After one or more buffers are loaded, the transmit process will assert an interrupt to the receive process. The transmit process will stop filling buffers when either it runs out of packets to send, or one of two conditions occur: for fixed length buffers, it finds a next buffer that is owned by the receive process (status bit is de-asserted). For variable length buffers, it finds that the difference between the receive and transmit buffer pointers (corrected for wrapping) is smaller than the space needed for the current packet. This last condition is similar to the preferred embodiment detailed previously.

The receive process will inspect the status bit of the first buffer and if it owns that buffer, will remove the contents into its network stack. The receive process will then de-assert the ownership bit back to the transmit process and move on to the next buffer. This process will stop when the next buffer is not owned by the receive process.

The buffer pointer is moved to the next buffer in the transmit or receive processes in either of two ways; for fixed length buffers, a simple constant increment from the current head of buffer to the next may be implemented. For variable length buffers, use is made of the length field (which could be made into 2 16 bit fields as described for Table 1), so the buffer length and 8 byte overhead added to the current head of buffer pointer to point to the next buffer. In this last case, the transmit process is always guaranteed to be ahead of the receive process for writing the status byte of the next buffer by ensuring the status byte of the next buffer is always initialized before turning the buffer ownership of the present buffer to the receive process.

Buffer wrapping is allowed in the variable length buffer case. In the fixed length buffer case it will not be an issue since there will be an integer number of buffers allowed to fit into the reserved network buffer memory space.

Use of fixed length buffers is seen to offer an inherent advantage over variable length buffers: transmit and receive processes can be de-coupled totally except through the locking mechanism (a signed comparison) which makes their implementation much easier. Furthermore, there is no need for the receive process to know where the transmit process has its pointer (or vice versa) since the status byte for each buffer is always accessible from both pointers. There is an inherent disadvantage in fixed buffers, that being the efficiency of use (average packet length vs. buffer length), but this could be minimized through using an alternative arrangement whereby smaller buffers are used and multiple buffer contain one packet.

Accordingly, the present invention provides a novel apparent network interface for and between embedded and host CPU's.

Modifications and substitutions by one of ordinary skill in the art are considered to be within the scope of the present invention which is not to be limited except by the claims which follow.

What is claimed is:

1. An apparent interface for enabling network based communications between two devices, namely a host processor included in a host computer and an embedded processor embedded in said host computer, said apparent interface comprising:

a host computer peripheral interface bus, for providing a communication path between said host processor and said embedded processor;

a host computer network based communications means, for providing an apparent network interface to only said embedded processor and for allowing said host computer to communicate directly with said embedded processor utilizing a network based communications protocol; and embedded processor network based communications means compatible with said host computer network based communications means, for providing an apparent network interface to only said host computer and for allowing said embedded processor to communicate directly with said host computer utilizing said network based communications protocol.

2. The apparent interface as claimed in claim 1, wherein said host computer network based communications means includes computer software comprising an NDIS mini-port driver running under a Windows operating system running on said host computer.

3. The apparent interface as claimed in claim 2, wherein said host computer operating system comprises Windows NT.

4. The apparent interface as claimed in claim 2, wherein said host computer operating system comprises Windows 95.

5. The apparent interface as claimed in claim 1 further comprising Hyper Text Transfer Protocol (HTTP) server software running on said embedded processor, for publishing a user interface for remote monitoring and control of said embedded processor.

6. The apparent interface as claimed in claim 1, further comprising first and second network buffers, wherein said first network buffer is a transmit buffer for said host processor and a receive buffer for said embedded processor, and wherein said second network buffer is a transmit buffer for said embedded processor and a receive buffer for said host processor.

7. The apparent interface as claimed in claim 6, wherein said first network buffer is disposed proximate said embedded processor, and wherein said second network buffer is disposed proximate said host processor to take advantage of read and write operation efficiencies.

8. The apparent interface as claimed in claim 1, wherein said embedded processor is used for an industrial automation application.

9. The apparent interface as claimed in claim 8, wherein said embedded processor is a machine vision processor.

10. The apparent interface as claimed in claim 1 further comprising routing software running on said host computer, for permitting said embedded processor to communicate with at least said host computer using said host computer's standard network connection and communication protocol.

11. The apparent interface as claimed in claim 1, wherein said embedded processor comprises a separate circuit board interfaced to said host computer via a host computer peripheral interface bus.

12. The apparent interface as claimed in claim 11, wherein said host computer peripheral interface bus comprises a Peripheral Component Interface (PCI) bus.

13. The apparent interface as claimed in claim 11, wherein said embedded computer circuit board further comprises memory, which is visible to said host computer via said host computer peripheral interface bus.

14. A method of providing an apparent network interface between two devices, namely a host processor included in a host computer and an embedded processor embedded in said host computer, said method comprising the steps of:

provviding a host computer peripheral interface bus including a communication path between said host processor and said embedded processor;

providing a host computer network based communications means, for providing an apparent network interface to only said embedded processor and for allowing said host computer to communicate directly with said embedded processor utilizing a network based communications protocol;

providing an embedded processor network based communications means compatible with said host computer network based communications means, for providing an apparent network interface to only said host computer and for allowing said embedded processor to communicate directly with said host computer utilizing said network based communications protocol;

writing data by said host computer over said peripheral interface bus to a memory location coupled to said embedded processor when data is to be written by said host processor and read by said embedded processor; and writing data by said embedded processor over said peripheral interface bus to a memory location coupled to said host processor when data is to be written by said embedded processor and read by said host processor.

15. The method of claim 14, wherein said date is written using bus-master burst-mode write cycles.

* * * * *